Sept. 12, 1961   G. E. GERHARDT   2,999,590
MINIMUM DIAMETER MEASUREMENT BY DIGITAL FLYING SPOT SCANNER
Filed Aug. 29, 1960   13 Sheets-Sheet 1

GERARD E. GERHARDT
INVENTOR.

BY
Samuel Brank Walker
ATTORNEY

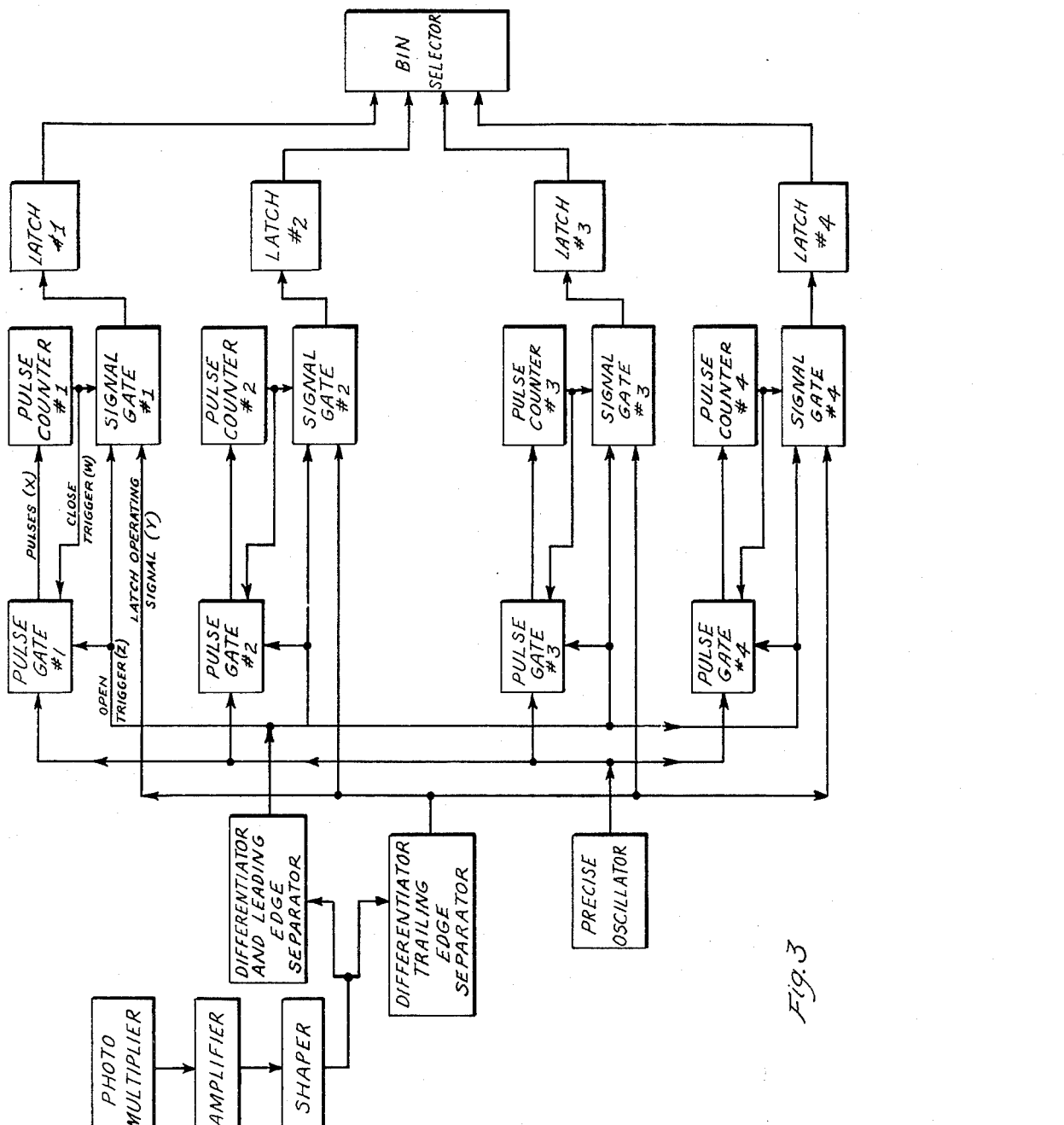

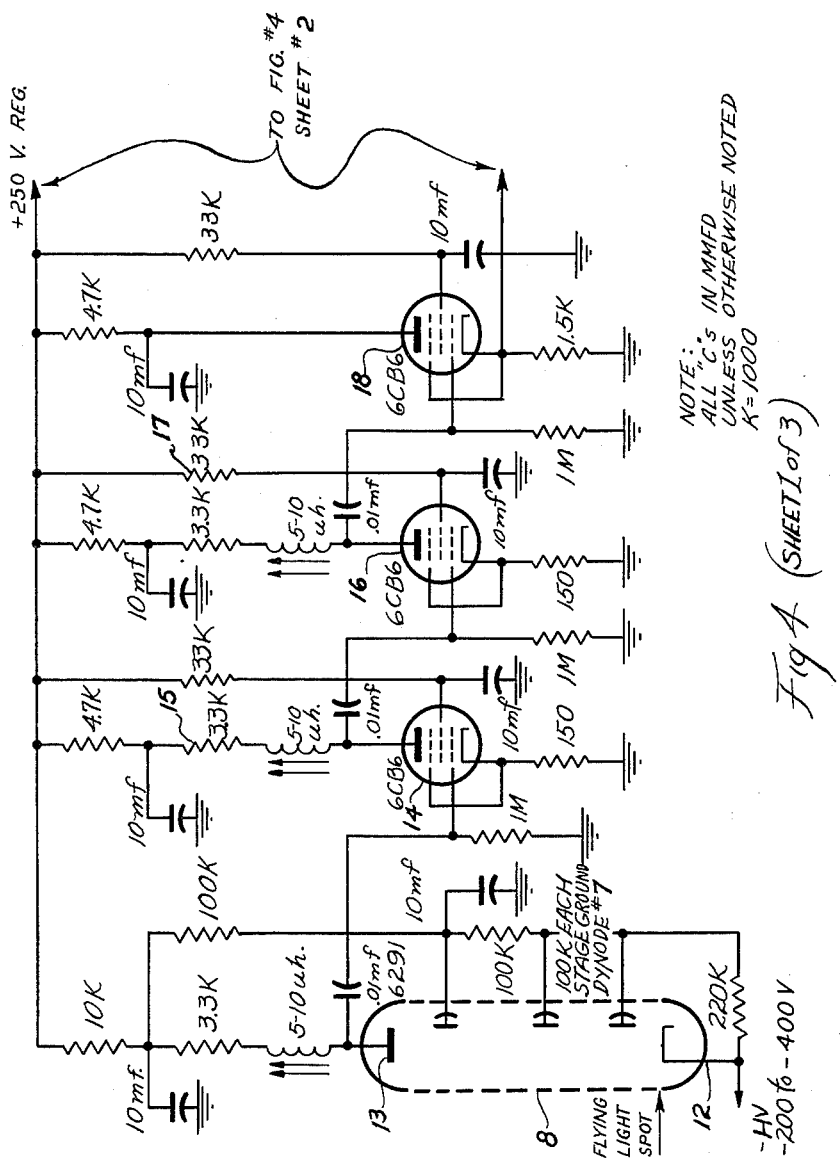

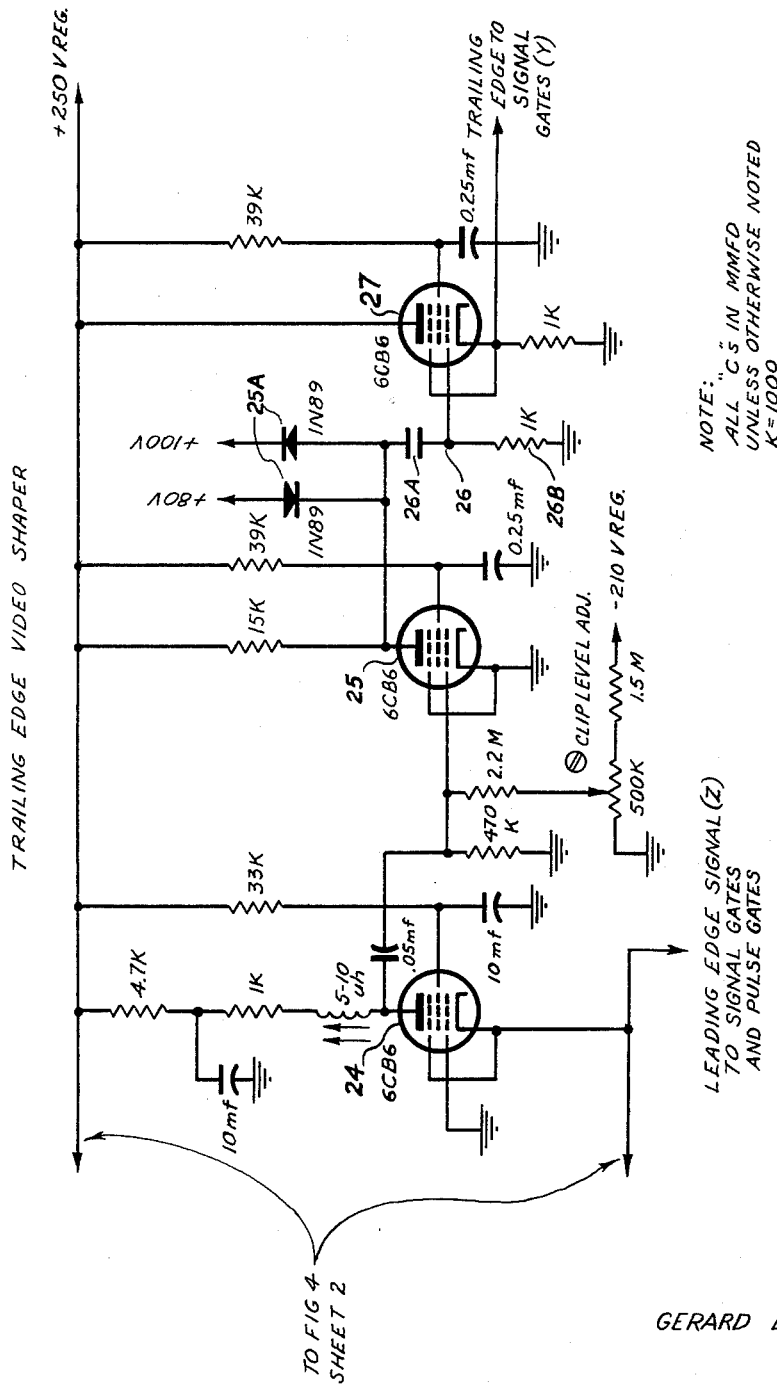

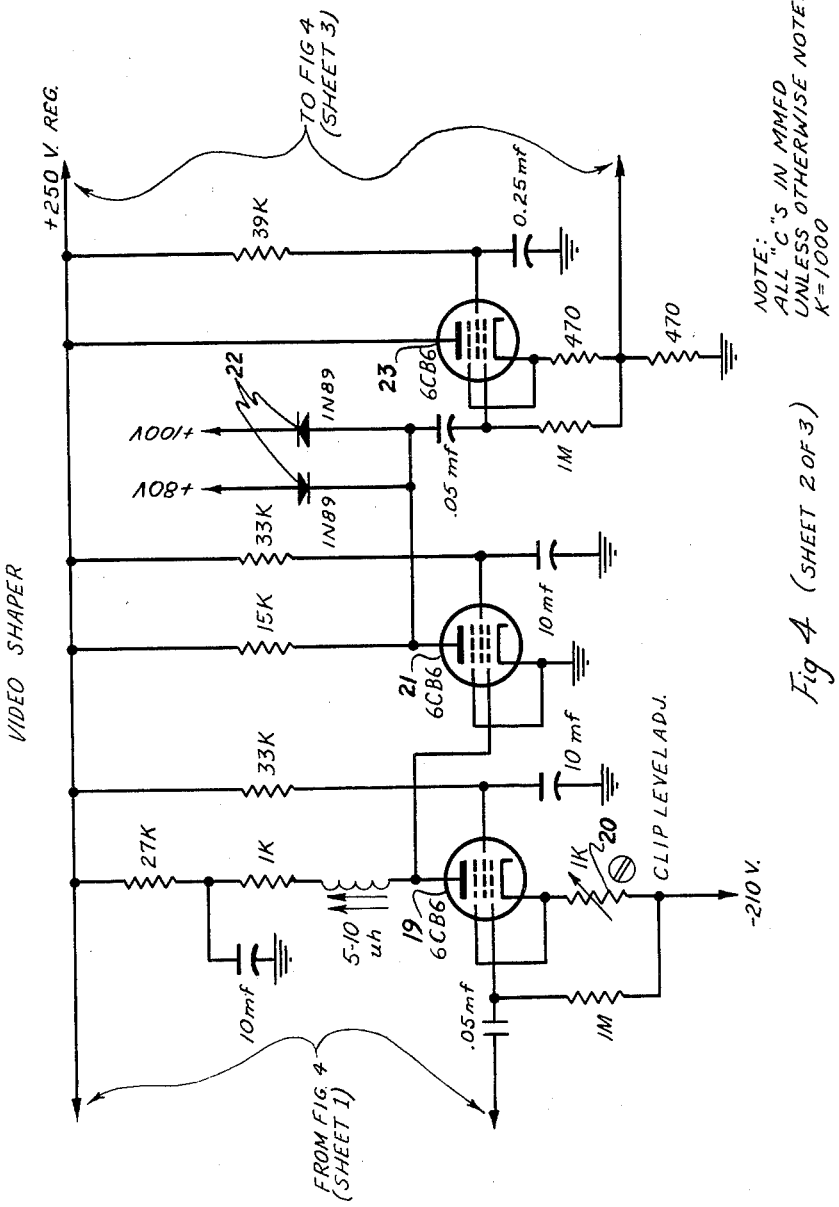

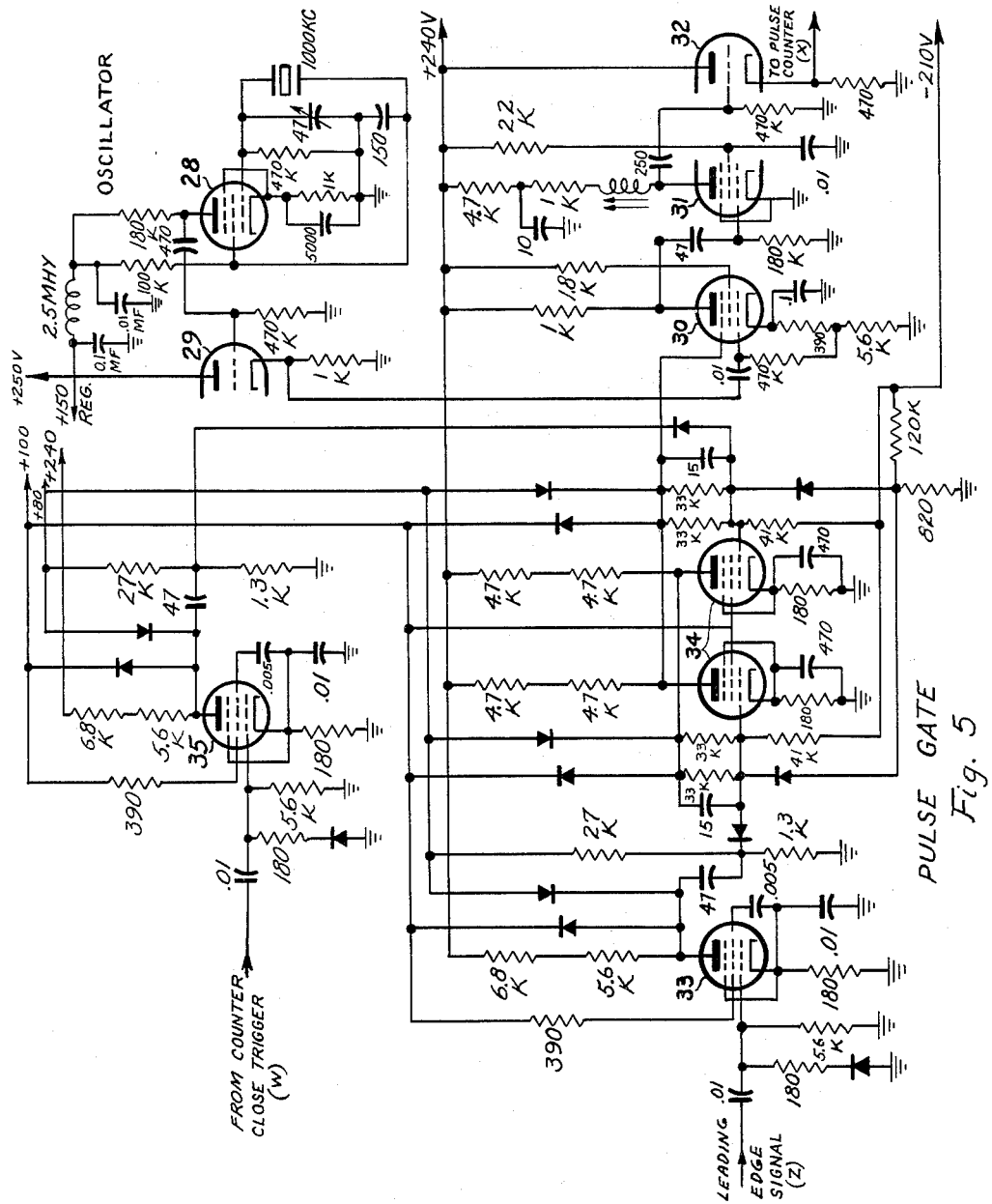

Sept. 12, 1961 G. E. GERHARDT 2,999,590
MINIMUM DIAMETER MEASUREMENT BY DIGITAL FLYING SPOT SCANNER
Filed Aug. 29, 1960 13 Sheets-Sheet 7

GERARD E. GERHARDT
INVENTOR.

BY
Samuel Branch Walker
ATTORNEY

Sept. 12, 1961 G. E. GERHARDT 2,999,590
MINIMUM DIAMETER MEASUREMENT BY DIGITAL FLYING SPOT SCANNER
Filed Aug. 29, 1960 13 Sheets-Sheet 2

GERARD E. GERHARDT
INVENTOR.

BY
*Samuel Branch Walker*
ATTORNEY

Sept. 12, 1961 G. E. GERHARDT 2,999,590
MINIMUM DIAMETER MEASUREMENT BY DIGITAL FLYING SPOT SCANNER
Filed Aug. 29, 1960 13 Sheets-Sheet 10

GERARD E. GERHARDT
INVENTOR.

BY

ATTORNEY

GERARD E. GERHARDT
INVENTOR.

Sept. 12, 1961 G. E. GERHARDT 2,999,590
MINIMUM DIAMETER MEASUREMENT BY DIGITAL FLYING SPOT SCANNER
Filed Aug. 29, 1960 13 Sheets-Sheet 13

GERARD E. GERHARDT
INVENTOR.

BY
*Samuel Brank Halk*
ATTORNEY

United States Patent Office 2,999,590
Patented Sept. 12, 1961

2,999,590
MINIMUM DIAMETER MEASUREMENT BY DIGITAL FLYING SPOT SCANNER
Gerard E. Gerhardt, Plainfield, N.J., assignor to American Cyanamid Company, New York, N.Y., a corporation of Maine
Filed Aug. 29, 1960, Ser. No. 52,642
10 Claims. (Cl. 209—82)

This invention relates to the rapid determination of the diameter of lengths of thin flexible strands or a single dimension of strip material, and classifying the measurements. More particularly, it relates to an apparatus and method for determining the minimum diameter present in a suture or other strand or filament to subsequently actuate a sorter to sort the lengths of strand or filament into groups having a specified minimum diameter for each strand or filament within the group. The size measurement for minimum diameter is accomplished by scanning the strand laterally by a flying light spot, moving at a known rate, intercepting the spot with the strand, photoelectrically converting the time of intercept to an electrical signal, and comparing this signal duration with a reference signal duration which has been digitally generated. The strand is sorted according to the results of the comparison.

There is a need for the sorting of various kinds of lengths of filaments into classes by the minimum diameter present within each length. In the manufacture of surgical sutures, catgut strands are formed by splitting various naturally occurring membranes and then twisting the segments into individual strings which are dried and otherwise treated to form lengths of catgut called strands. When finished, sterilized and ready for use, these strands are called sutures. In the surgical field, the demand is for sutures having certain specified sizes. The maximum diameter of a particular suture determines the size classification of that suture. The minimum diameter determines the strength, for homogeneous material. As the demand is for sutures having a maximum tensile strength within each given size, it thus becomes desirable to have the sutures made up from strands of catgut of uniform diameter, which diameter is just within the maximum diameter for each size of suiture. Because of the difficulties involved in cutting the tissue so that the twisted strings are of uniform characteristic, particularly diameter, it is usually more convenient to cut the tissues, twist to form strings, treat the strings to form a dried strand, and then classify the strands into groups by minimum diameter so that the minimum diameter of each strand within a particular group is larger than the finished diameter of the sutures to be formed from that group and, by the same token, each strand is sorted into the group which permits the largest suture possible to be ground from that strand. It is wasteful to cut down a large diameter to further than minimum required for uniformity and, additionally, if the strand is reduced in size too much by grinding, there is a tendency for the finished suture to fray. The maximum diameter of sutures within each group is determined by the standards set up for the medical profession. In the United States, the standards are those of the United States Pharmacopoeia.

In the past, sutures have been classified by a manual operation of drawing each strand under a measuring dial and hand sorting. It is well recognized that manual labor of any type is comparatively expensive, and that, whenever possible, it is desirable to substitute a more economical, automatic system for hand operations. The theories of automation are well recognized. The specific problems within a specify industry are more difficult to resolve.

The device described herein, more fully below, permits the classification of lengths of such strands by the minimum diameter found along such length upon actuation of an optical scanning of the strand length. More specifically, a mechanical device is actuated by signals from optical scanning to reciprocate a specific bin corresponding to the correct classification into a position where it can receive the suture length being measured.

It is an advantage of my invention that with its aid one is able to sort strand lengths mechanically, rapidly and accurately according to the minimum diameter of each strand. A further advantage of my invention is that it is possible to classify a filament by whether or not it meets certain minimum diameter standards or even more importantly to classify the filament properly into a plurality of groups according to the minimum diameter present.

One advantage of the novel classification system is that the strand is measured along a plurality of diameters by a flying spot scanning system, and each diameter is measured by the duration of time required for the spot to pass. The spot scan rate is controlled and constant; hence, the time required for the spot to traverse the strand is a measure of the strand diameter. The diameter measurement is therefore reduced to a measurement of time and is essentially independent of signal amplitude. Conventional measuring systems, in general, measure by comparison of the amplitudes of signals, and are much more subject to serious drift problems. The diameter measurements are effected in an array of pulse width discriminators, with each discriminator so arranged as to produce an output only if the suture pulse is shorter than the reference pulse. The reference pulse is generated digitally and its length is accordingly precisely known.

A latching relay is set by each discriminator to be actuated if the strand is below a certain minimum. A series of scans are made for each strand. With certain latches set by each scan, the one corresponding to the minimum diameter for each strand inactivates the latches for all larger diameters, and controls the sorting of the strand.

The invention can be better understood with reference to the accompanying drawings in which:

FIGURE 3 is a block diagram of the electronic system.

FIGURE 4 (on three sheets) is a schematic diagram of the portion of the electrical circuit which converts the optical signal into selected electrical signals.

FIGURE 5 is a schematic diagram of the precise oscillator which generates the clock pulses and a pulse gate which controls their use as a reference.

Scanner

Figure 1:
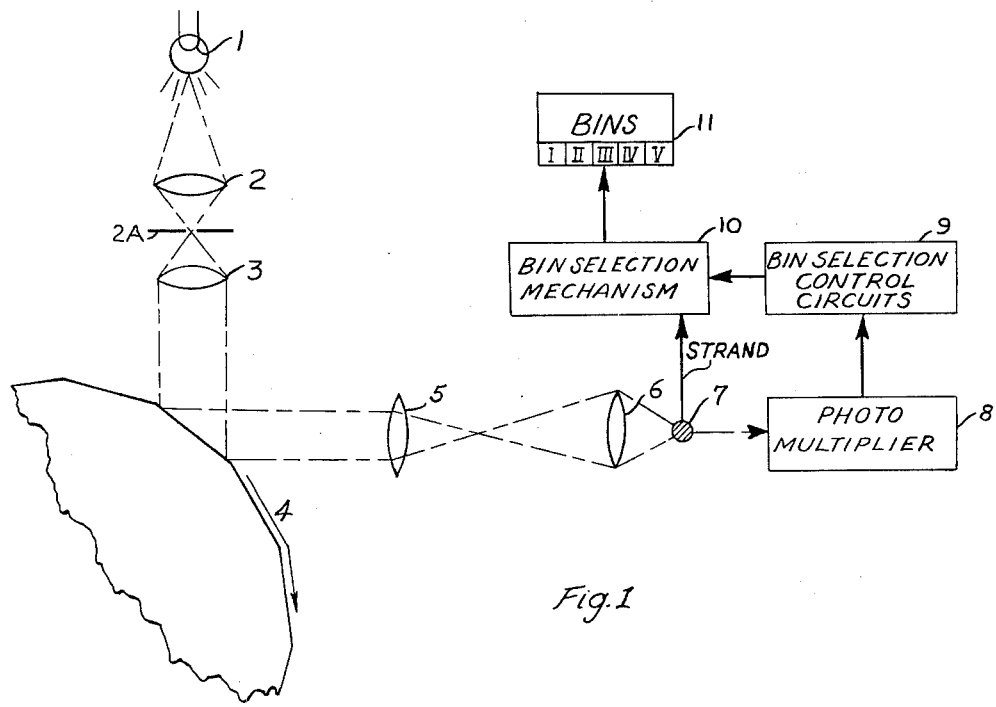
FIGURE 1 is a schematic of the optical system and its relation to the electro-mechanical mechanism.

As shown in FIGURE 1, the light from a light source 1 is focused through a condenser lens 2 and a collimator lens 3 through a small aperture 2A between the said lenses upon a rotating mirror drum 4. As shown, the mirror drum 4 is a sixteen-sided mirror with faces approximately one inch square, which is rotated at a constant speed. About 1800 r.p.m. gives good results and is a submultiple of the ordinary 60 cycle A.C. line power source. This speed gives 480 scans per second. Exactly 1875 r.p.m. gives 500 cans per second which makes calculations easier. The light from the source is reflected from successive faces of the mirror drum 4 through a collector lens 5 upon an image lens 6. The size of the collector lens 5 controls the length of the scan to be carried out and is preferably adjusted so that the following scan starts before the first scan is completed, so that the photomultiplier 8 is always illuminated except when the strand intercepts the light spot. By means of the lenses 5 and 6, the moving light spot is focused upon the center of the plane in which the strand 7 is located. The spot must be smaller than the strand diameter, and is preferably much smaller. The moving spot from the scan falls upon a photo sensitive device, preferably a photomultiplier 8, and by means of bin selection control circuits 9, to be described below in detail, actuates a bin selection mechanism 10 according to the minimum diameter found in the strand. The strand 7 is then dumped into the bins 11.

As shown diagrammatically in FIGURE 3 and in detail in FIGURE 4, the moving light spot after passing the strand falls upon the cathode 12 of the photomultiplier 8 which controls the current to the anode 13. The photomultiplier is conveniently a tube type 6291, with a plurality of dynodes to increase the sensitivity. The connections to this tube are conventional, and include high frequency compensation to increase the band width. The voltage at the photomultiplier anode is A.C. coupled to the grid of the first amplifier tube 14, which conveniently is a conventionally connected 6CB6. Consequently, a signal voltage is developed across plate resistor 15 which is condenser coupled to the signal grid of the second amplifier tube 16, also a 6CB6. The tube 16 develops a signal voltage across its plate resistor 17 which is fed to a first cathode follower tube 18, also a 6CB6. The output from the first cathode follower tube 18, a 6CB6, goes to the grid of the clipping level adjust tube 19 whose cathode bias is set by a first adjustable resistor 20. The amplification in this tube can be controlled by the cathode bias resistor. The plate of the clipping level adjust tube is D.C. connected to the grid of the first clipping tube 21, also a 6CB6. The plate swing of tube 21 is limited between +80 and +100 volts by two 1N89 clamp diodes 22. The signal, as thus shaped and clipped to an essentially rectangular pulse, is capacitor coupled to the grid of the second cathode follower tube 23, also a 6CB6. The output from the tube 23 is fed as the leading edge trigger signal Z in the pulse gates and the signal gates, as is described below. The signal from the cathode of tube 23 is also fed directly to the cathode of the grounded grid amplifier tube 24, also a 6CB6. The output signal of the grounded grid amplifier tube is capacitor coupled to the grid of the clipping amplifier tube 25, also a 6CB6. The signal grid potential is controlled by a dropping resistor network, and potentiometer from a negative voltage source so the amplification and output waveform may be controlled. The partially shaped signal from the plate of the clipping amplifier tube 25 is clamped between 80 and 100 volts by a second pair of 1N89 clipping diodes 25A, and then passes through a differentiator 26 consisting of a small capacitor 26A and differentiator resistor 26B to the grid of the second cathode follower tube 27. The output from the second cathode follower tube 27 is the trailing edge signal Y which is sent to the signal gates as indicated in FIGURE 3 as the latch operating signal. The signal gates are described below.

Oscillator

As shown in FIGURE 5, a conventional precise crystal controlled oscillator 28, a 6AU6 tube, generates a signal at a very precisely controlled frequency, conveniently 1000 kilocycles per second. This signal, hereafter called the clock pulse signal, or pulses, goes through a cathode follower buffer tube 29, ½ of a 5963, to the signal grid of the pulse gate tube 30, a 6EN6. When the gate is open, the pulse signal goes to the grid of pulse amplifier tube 31, ½ of a 6U8. The amplified output then goes to the pulse cathode follower tube 32, ½ of a 6U8, and from there to the pulse counter described below, as the pulses X.

Pulse gate

The gate of the pulse gate tube 30, a 6BN6, is opened to the passage of the reference signal, indirectly, by the leading edge signal Z of the scaning signal coming from the second cathode follower tube 23 shown in FIGURE 4. As illustrated in FIGURE 5, the leading edge signal Z is fed through a capacitor to the grid of the leading edge amplifier tube 33. The output of this tube is fed through a differentiator capacitor and resistor to the signal grid of the first tube of the flip-flop tubes 34 whose output signal is connected to the control grid or gate of pulse gate tube 30. Flip-flop tubes 34 are actuated to close the gate of pulse gate tube 30 by the close trigger signal W coming back from the reference pulse counter, described below.

The close trigger signal from the reference pulse counter goes to the signal grid of the close trigger amplifier tube 35. The signal from said tube 35 then passes to the second tube of the flip-flop tubes 34 which completes the flip-flop and closes the gate of pulse gate tube 30.

Although not strictly necessary, improved reliability and stability of performance is obtained if the plate voltages of the leading edge amplifier tube 33, both tubes of the flip-flop tube 34, and the close trigger amplifier tube 35, are limited by clamping diodes between 80 and 100 volts. Diodes may be used in the control grid circuit of the flip-flop tubes to increase response speed.

Figure 6:
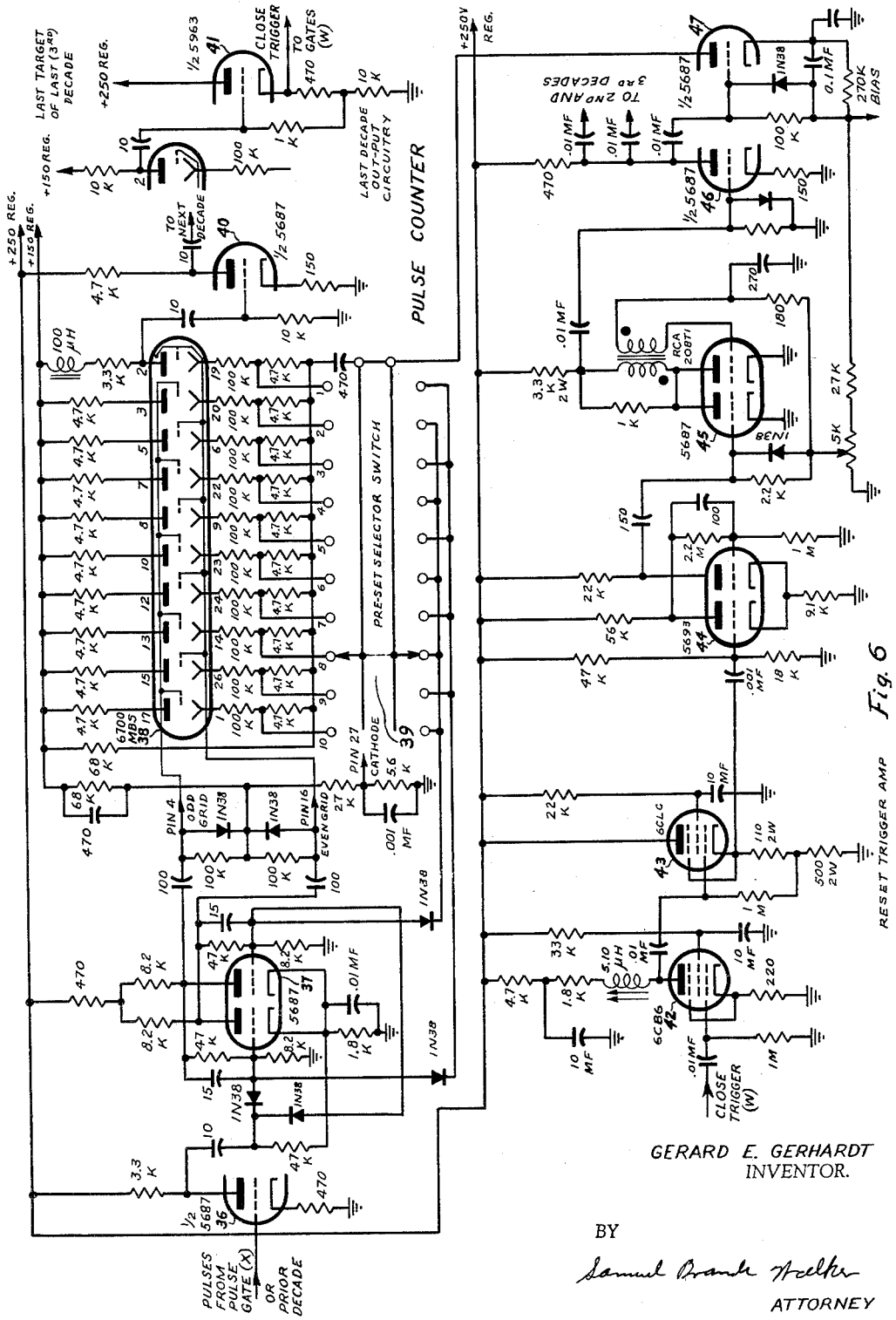
FIGURE 6 is a schematic diagram of the pulse counter.

As shown in FIGURE 6, the oscillator pulse signal X which passes through pulse cathode follower tube 32 is fed directly to the grid of the counter decade input amplifier tube 36, ½ of a 5687. From the plate of this amplifier, the signal is passed through a capacitor to a binary divider flip-flop tube 37, a 5687. The output from this tube 37 drives a magnetic beam switching tube 38, a MBS6700, which gives one output pulse for each 10 input pulses, unless set for a smaller number.

Counter

Three magnetic beam switching tubes 38 are cascaded in a set, the first being used to count the digits, the second to count the tens, and the third to count the hundreds. Each of such MBS tubes 38 is, as described below in connection with the operation of the apparatus, preset by a preset selector switch 39, there being one such preset switch for each magnetic beam switching tube 38. In operation, each set of three cascaded magnetic beam switching tubes 38 is preset with a number which is complementary to 1000, the count at which the set of three MBS tubes completes its count, and passes the pulse signal along. The output of the first two magnetic beam switching tubes 38 goes to switching output amplifier tube 40, ½ of a 5687, and the amplified impulse goes to the next magnetic beam switching tube. The output of the last magnetic beam switching tube goes to the grid of the final switching output amplifier tube 41 whose close trigger output W is used at 3 points in the system. The first is to the grid of the close trigger amplifier tube 35, through which the pulse actuates the flip-flop tubes 34 to close the pulse gate, and thus end the pulse count. The second is to the signal gate, further described in conjunction with FIGURE 7. The third is to a reset amplifier, which is part of the pulse counter. In this, the signal first goes to the grid of the first reset amplifier tube 42, the output of which is capacitor connected to the grid of the reset cathode follower tube 43, and then a one shot multivibrator tube 44 (which provides a short delay between the termination pulse W and the resetting of the preset counters). The output of the one shot multivibrator tube 44 goes to the blocking oscillator tube 45, which in turn feeds the reset drive tube 46, ½ of a 5687, which in turn drives a reset tube 47, ½ of a 5687. There is one such reset tube 47 for each magnetic beam switching tube 38. Each reset tube resets its own magnetic beam switching tube 38.

Only one magnetic beam switching tube is shown in the drawings. Three such tubes, connected in cascade to count to a maximum of 1000, are used in a set. The wiring is essentially the same, except for the minor modification in the output amplifier tube, as shown and described above.

As shown in FIGURE 3, a separate pulse counter, including the reset, is used for each latch.

Figure 7:
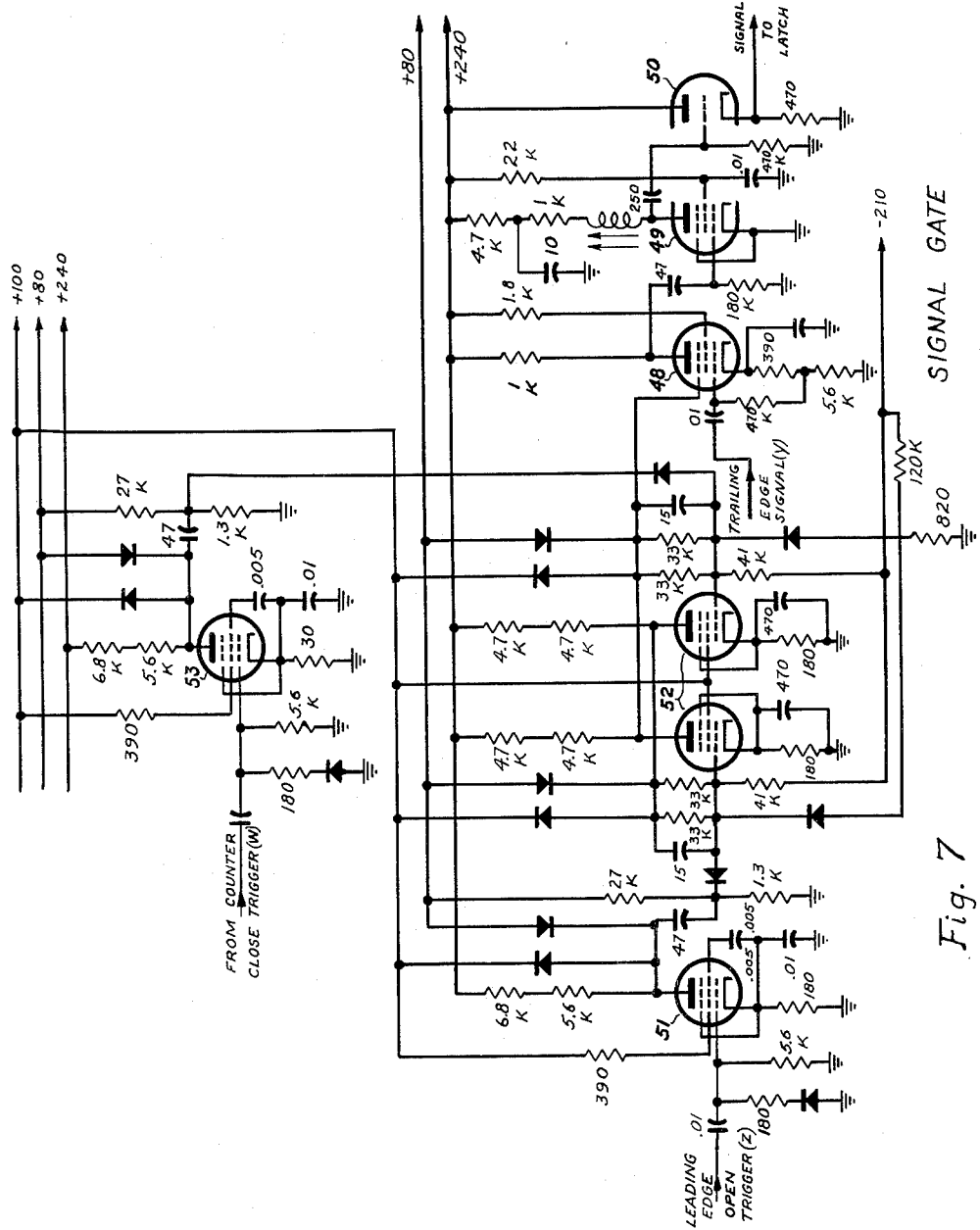
FIGURE 7 is a schematic diagram of the signal gate (or pulse width discriminator) circuit which controls the latch.

In FIGURE 7, is shown a schematic of the signal gate, the key to the entire apparatus. This gate operates in the same way electrically as the reference pulse gate described earlier, but with its own signal and control gate system. The trailing edge Y of the scanning signal coming from the second cathode follower tube 27 (FIGURE 4) enters the signal grid of signal gate tube 48, a 6BN6, as a latch operating signal. When allowed to pass through the signal gate tube 48, the trailing edge, or latch operating signal, passes to the grid of the latch pulse amplifier tube 49, the pentode section of a 6U8, and then to the latch cathode follower 50, the triode section of a 6U8, from which the trailing edge, when permitted to pass, goes on to the latching mechanism described below.

The gate of signal gate tube 48 is opened in the same way as the gate of the pulse gate tube 30, by the leading edge of the scanning signal pulse or open trigger Z from the second cathode follower tube 23 to the grid of the diode clamped signal gate leading edge amplifier tube 51, a 5654. This amplifier feeds into one side of signal gate flip-flop tubes 52, a pair of 6AH6, which in turn opens signal gate tube 48. The close trigger pulse W from the counter is fed to the grid of the signal gate close trigger amplifier tube 53, a 5654, and there amplified, and thence to the other side of the signal gate flip-flop tubes 52. Thus, the last count pulse from the MBS tube 38 actuates the closing side of the signal gate flip-flop tubes 52 and therefore closes the gate of the signal gate tube 48. The details of this switching circuit are essentially the same as for the pulse gate, shown in FIGURE 5.

For those scans in which the strand pulse is shorter than a set size, the latch operating signal arrives at the signal gate before the close trigger pulse arrives, and the latch operating signal passes through the gate, and goes to the latch.

The above circuitry is repeated for each pulse gate, pulse counter and signal gate. Four such replications for four latches are shown diagrammatically in FIGURE 3, and in more detail in FIGURE 8.

Figure 8:
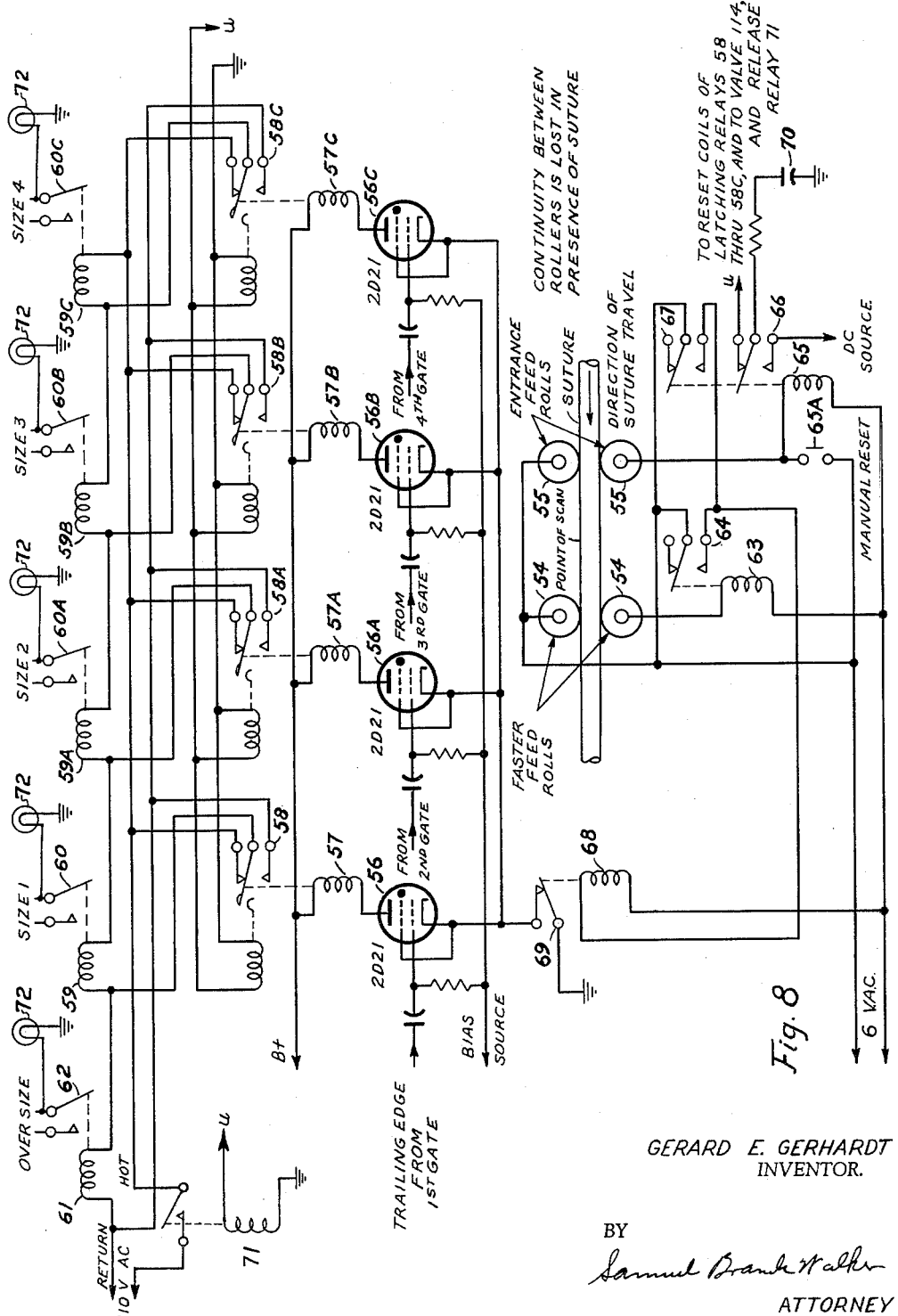
FIGURE 8 is a schematic diagram of the electrical circuit for the latch of the bin selector.

The latching circuits are shown schematically in FIGURE 8. The trailing edge of the suture pulse, now a latch operating signal, is fed to the control grid of a latch operating signal, is fed to the control grid of a latch thyratron tube. For four gates, there are four such thyratron tubes, 56, 56A, 56B and 56C.

*Suture Feed*

The strand or suture being measured is fed through a set of entrance feed rolls 55, past the point of scan, through a pair of faster feed rolls 54, and to the bin selector. The rolls are electrically insulated and form the contacts of an electric switch, as well as feeding the strand. The entrance feed rolls are connected to the coil of a double pole double throw relay 65, and are shunted by a manual reset button 65A. The coil is energized when no strand is present between the entrance feed rolls 55. The first pole 66 charges a reset coil condenser 70 from a D.C. source when the relay is energized, and connects the reset coil condenser to the reset coils of the latching relays 57, 57A, 57B and 57C when de-energized. The second pole 67 energizes the coil of a cathode return relay 68 when its own coil is energized.

The faster feed rolls 54 are connected to the coil of the faster feed roll relay 63, a single pole double-throw relay. Only one set of the faster feed roll relay contacts 64 is used, and is connected in parallel with the second pole 67 of the double-pole double-throw relay 65, to energize the coil of the cathode return relay 68.

The cathode return relay 68 is a single pole normally closed relay. When energized, the cathode return relay points 69 open, thus de-energizing the cathodes of the latch thyratron tubes 56, 56A, 56B and 56C. Thus, the thyratron cannot fire unless there is a strand between both the entrance feed rolls 55 and the faster feed rolls 54. Once fired, each of these thyratrons remains conductive until the cathode return relay opens.

The plate of each of the latch thyratron tubes is connected through the operating coil of an electrical reset, single pole double throw latching relay 57, 57A, 57B and 57C, to a plate potential source (B+). Reset relays are used, with a separate reset coil connected to the normally closed contact of the first pole 66 of the double-pole double-throw relay 65. When the double-pole double-throw relay is closed, when the end of a strand passes, the thyratrons are de-energized immediately, and the operating coil of the latching relays 57, 57A, 57B and 57C are de-energized immediately. The reset coils are deliberately designed to function more slowly, to hold the size information until it can be used.

The sorting bins 101, 101A, 101B and 101C are controlled through solenoid air valves 115, 115A, 115B and 115C which are operated by sorting relays 59, 59A, 59B and 59C. An oversize relay 61 is provided to give a signal light 72 size indication. The oversize relay contacts 62 energize a corresponding signal light. The size sorting relays 59, 59A, 59B and 59C correspond to sizes designated arbitrarily 1, 2, 3 and 4. The sorting relay contacts 60, 60A, 60B and 60C, respectively, control the solenoids for the respective bin sizes, and also a signal light 72, for each size, to show visually the size of each strand. A counter may be connected in if desired.

The coils of the oversize relay 61, and the sorting relays 59, 59A, 59B and 59C are connected in series, with one end of the size 4 sorting relay 59C connected to the hot side of an A.C. line, through a release relay 71, and the opposed end of the oversize relay 61 connected to the return side of said A.C. line. The normally open contact of each of the latch relay contacts 58, 58A, 58B and 58C is connected to the return side of said line. The normally closed contact of each of the latch relays is connected to the hot side of the A.C. line. The moving contact of each relay is connected to the junction between the respective sorting relay coil and the coil of the next larger size coil (smaller size number). Inasmuch as the latching relay is also operated for any larger bin, the sorting relay is thus energized for only the bin for the smallest size, which is the one in which the strand belongs. The sorting relays are designed to close rapidly and open slowly enough to permit the solenoid valves, later described, to perform a completed cycle.

A release relay 71 is put in the hot side of the A.C. line and is controlled by the first pole of the double-pole double-throw relay 65 from the latching coil condenser 70 so that the sorting relays are actuated only after a strand has passed, and for the proper size only.

Mechanical sorter

Figure 9:
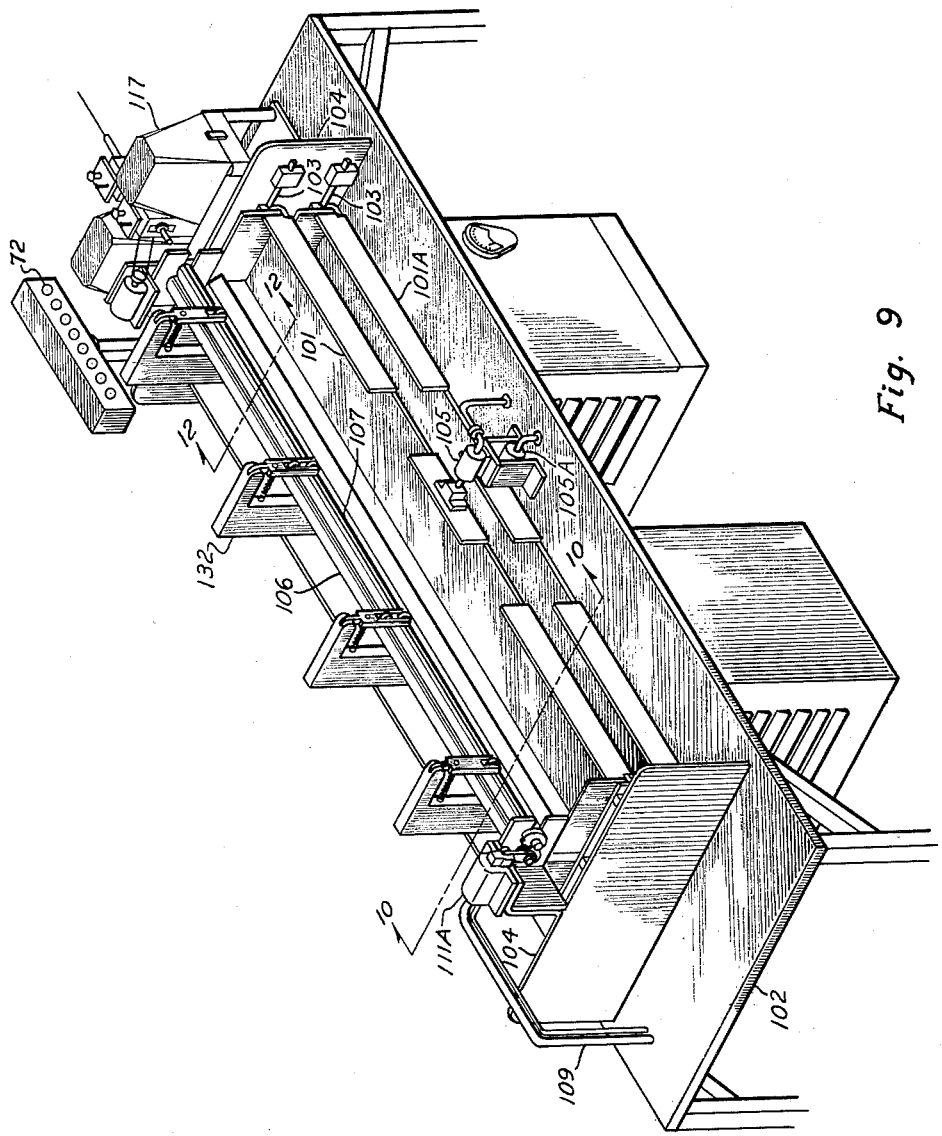
FIGURE 9 is a pictorial of the mechanical sorter.
Figure 10:
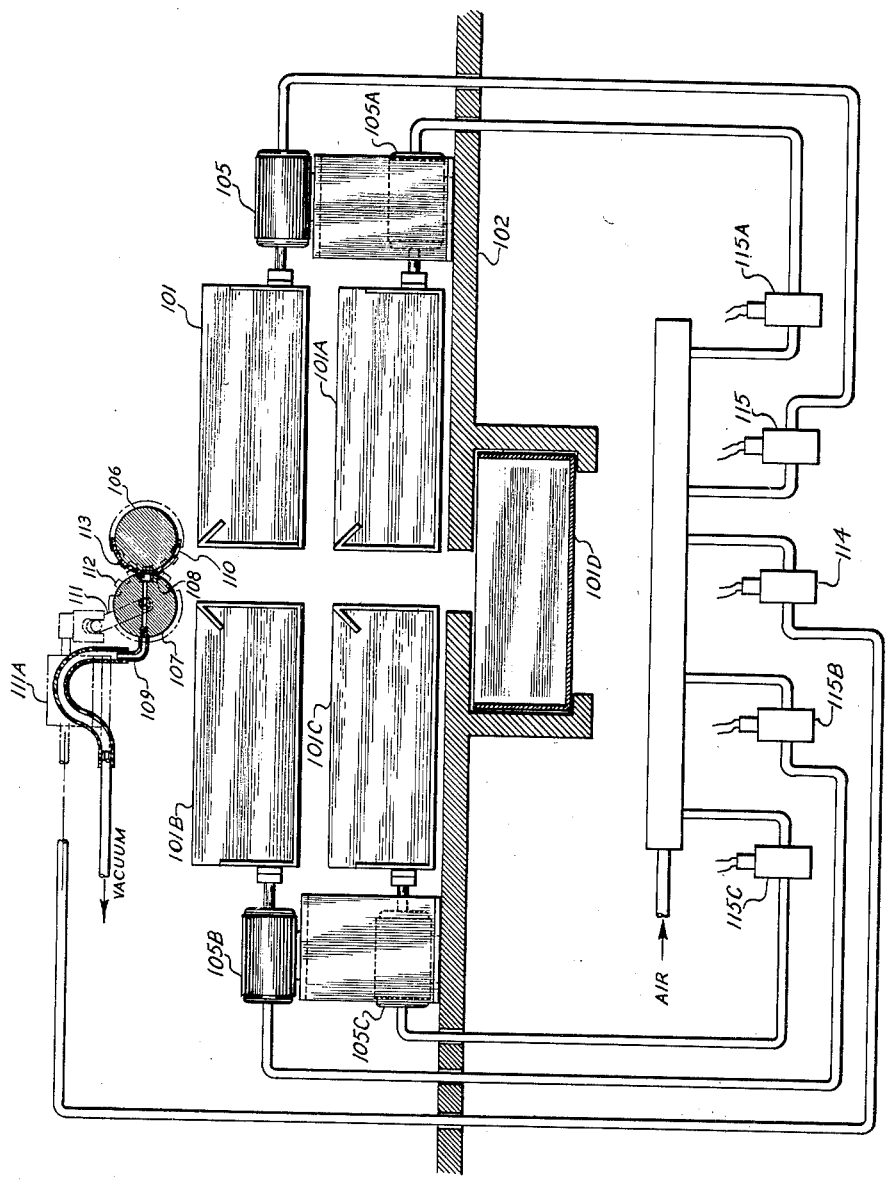
FIGURE 10 is a partial sectional elevation along lines 10—10 in FIGURE 9 showing the bins.

A series of bins 101, 101A, 101B, 101C and 101D are supported upon a table 102 for sizes 1, 2, 3, 4 and oversize, respectively. A cross section of these bins is shown in FIGURE 10. The pictorial, FIGURE 9, shows the bins in relationship to the entire apparatus. In FIGURE 9 the front bins, 101 and 101A, can be seen; the rear bins, 101B and 101C, are behind the supports for the rotatable bar retainers 132 and are not visible; the oversize bin 101D is underneath the visible structure. The bins 101, 101A, 101B and 101C are slidingly mounted upon guide rails 103 affixed to vertical panels 104. The fifth bin 101D does not move, but rests below the table in such a position that when the other bins are in their inactive position the suture will drop into oversize bin 101D, there being a slot in the table for access. The four movable bins are moved into position by individual air cylinders 105, 105A, 105B and 105C which have internal springs to retract the bins.

Figure 12A:
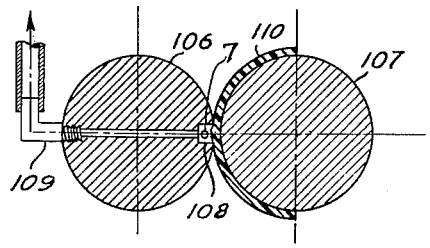
FIGURE 12a is a section along lines 12—12 of FIGURE 9 showing the measured strand in the dropping groove.

Above the gap between the bins are two rotatable bars 106 and 107. Grooved rotatable bar 106 has a rectangular groove 108 on the side normally towards the rubber-faced rotatable bar 107. This groove 108 is connected to vacuum line 109, at the end away from the feed and gaging mechanism. The rubber-faced bar 107 has a rubber facing 110 on its periphery facing the grooved bar 106. The two bars are rotatably mounted so that in the normal position the rubber facing 110 seals the groove 108 as shown in FIGURE 12a. Partial rotation of the bars 106 and 107 is effected by a bell crank 111 actuating drive gear 112, which meshes with driven gear 113. Bell crank 111 is actuated by the dumping cylinder 111A. This cylinder is a conventional spring return air actuated cylinder which rotates the bell crank, and through it the two gears 112, 113, which are fastened to the two rotatable bars 106, 107, and thus turn the bars to dump the strand 7 which is in the groove 108. Air to the dumping cylinder 111A is fed through dumping air valve 114, a slow release solenoid valve which is actuated in turn through the first pole 66 of relay 65. The action of the dumping cylinder is slow enough to permit the strand to be released by the feed rolls, 54 and 55, before the dumping starts. The air cylinders 105, 105A, 105B, and 105C, which move the bins 101, 101A, 101B and 101C are actuated by air from air valves 115, 115A, 115B and 115C.

These valves are solenoid type valves which are selectively actuated by the sorting relays 59, 59A, 59B and 59C. Only one is actuated for any one dumping action, to receive the gauged strand in the appropriate bin.

At the end of the bars, 106 and 107, away from the vacuum line 109, is mounted the mechanism for feeding the stand into the rectangular groove 108 and the scanning device housing 117 containing the scanning device previously described.

Figure 11:
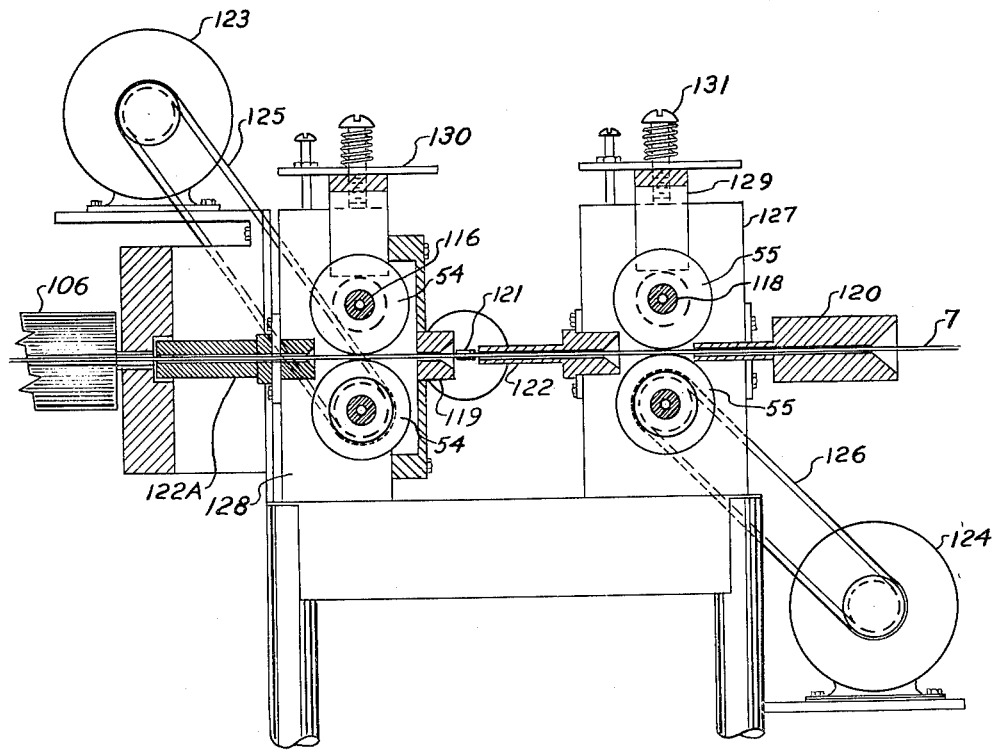
FIGURE 11 is an elevation in partial section of the feed mechanism showing the strand passing the point of measurement.

As shown in FIGURE 11, the strand is fed between two pairs of rolls. The entrance feed rolls 55 are electrically conductive rolls mounted in insulating bushings 118. The rolls themselves are conductive metallic rolls mounted on insulated bushings. The lower roll is driven through a belt 126 by an electric motor 124. The second set of feed rolls, the faster feed rolls 54, also on insulated bushings 116, are driven by a second electric motor 123 through a second belt 125. The pulleys are chosen so that the peripheral speed of the faster feed rolls 54 is at least about 5 percent higher than the normal speed of the entrance feed rolls 55. Each is driven by its own electric motor and hence after the strand passes through the entrance feed roll and the guide tube 122, the scanning area and the control tube 119, it is picked up by the faster feed rolls so that the strand is stretched and hence kept under tension. The motors are conveniently both small induction motors and hence the first motor 124 is speeded up so that it acts as a drag on the strand.

Figure 14:
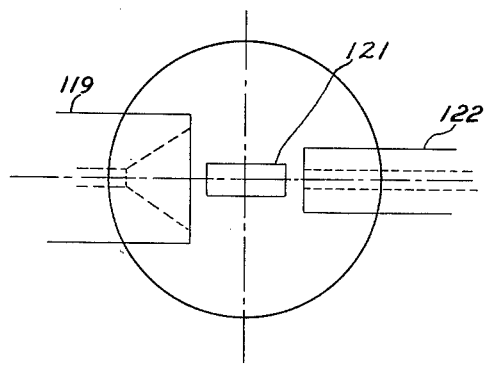
FIGURE 14 is an elevation of the spot path.

The strand 7 is hand fed into an entrance tube 120 which feeds into the bite of the entrance feed rolls 55. The strand, as it comes out of these rolls, is directed by a guide tube 122 which controls the free motion of the strand and directs it across the scanning area 121. As shown in FIGURE 14, the scanning area may be a slot in the housing through which the scanning beam of light, earlier described, is passed. The strand, after passing the scanning area, passes to the control tube 119 which guides its motion into the bite of the faster feed rolls 54 from which the strand passes to the transfer tube 122A which controls its path until it reaches the rectangular groove 108 in the rotatable bar 106. The suction in the rectangular groove from the vacuum line 109 draws the strand into the groove and prevents the strand from buckling. The entrance feed rolls 55 are supported in a roll support 127 with the upper roll being held down by a hold-down clamp 129 which is positioned by spring-loaded screws 131. Thus, when there is no strand between the rolls, the rolls are caused to press against each other, and as shown in FIGURE 8 the rolls are attached across the coil of the double-pole double-throw relay 65 as earlier described. Similarly, the faster feed rolls 54 are mounted in a second roll support 128 and are held down by a second hold-down clamp 130. The contacts to the rolls and the other details are conventional.

As the rotatable bars 106 and 107 may be long enough to buckle and leak air, rotatable bar retainers 132 are positioned with rollers and springs to press the bars towards each other at several points along their lengths.

Operations

In operation, the individual strands of the material which, when finished, is to form the suture, called the strand, is fed by hand to the entrance tube 120 as diagrammatically shown in FIGURE 11. It is pushed by hand in through the entrance tube until the strand contacts the entrance feed rolls 55, after which the operations are automatic. The strand is fed mechanically by these entrance feed rolls, while the operator selects another strand to be fed through the entrance tube to the entrance feed rolls, as soon as the preceding strand has been gauged and sorted. These rolls conveniently may move at a surface speed of from 20 to 60 inches per minute. The strand, as it is picked up, is fed through the guide tube 122, past the scanning area 121, through the control tube 119, and into contact with the faster feed rolls 54, after which it is fed to the transfer tube 122A, and thence into the grooved rotatable bar 106. As the faster feed rolls 54 are rotated at a speed of from about 5% to 10% faster than the entrance feed rolls, the strand is immediately stretched and the second electric motor 123 controls the feed rate while the electric motor 124 and the entrance feed rolls 55 are in fact driven by the strand and act as a drag. As is well known, an induction motor normally rotates somewhat slower than its magnetic field, and if rotated at the same speed as the magnetic field furnishes no power and if driven at a slightly faster speed than the magnetic field actually feeds back into the circuit, hence the relative drag of the motor 124 keeps the strand in tension. Drag clutches, friction bands, overrunning clutches, and the like, may be used, but the action of an induction motor is uniform, smooth and inherent with a minimum possibility of mechanical failure.

Figure 12B:
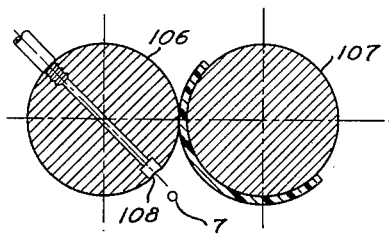
FIGURE 12b is a similar view as the strand is released.
Figure 13:
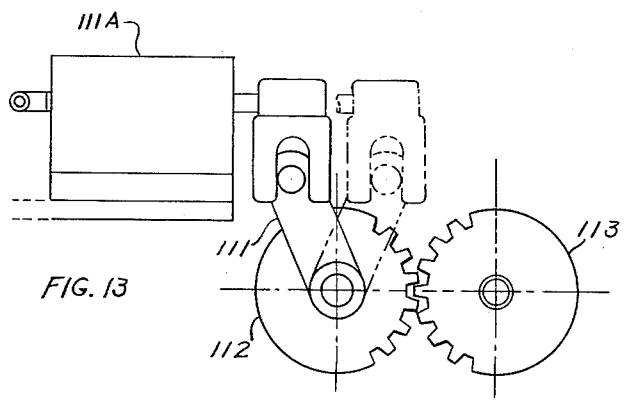
FIGURE 13 is an elevation of the suture strand dropping device.

The vacuum line 109 reduces the air pressure in the rectangular groove 108 and thus actually sucks the strands into the rectangular groove. As the strand is light and is easily moved, it is drawn into the groove, the vacuum pulling against the faster feed rolls 54, but not being strong enough to effectively alter the speed. As soon as the rear end of the strand has cleared the faster feed rolls, the suction tends to accelerate the strand, but as soon as the end of the strand hits the end of the groove, its motion is stopped. For small strands, the strand may actually buckle somewhat, whereas for the larger, stiffer strands it is more apt to stay straight. Meanwhile, the gauging mechanism has functioned, as described below, a bin has been selected, and the dumping air valve 114 is actuated. The correct bin slides into position or the signal is given for all bins to remain in place and drop the strand in the oversize bin and, as the bins are moving into position, the dumping cylinder 111A is rotating the drive gear and the driven gear which in turn rotates the grooved rotatable bar and the facing rubber-faced rotatable bar. As soon as these bars start to rotate, as shown in FIGURE 12b, the vacuum is broken and the strand is released. Preferably, the rotatable bar is turned to approximately 45° and for very small strands, an air jet can be used to assist in releasing the strand. The strand falls downward into the proper bin. FIGURE 10 shows the bins in the rest position. This position of the bins would be used for dropping the strand into the oversize bin 101D.

FIGURE 9 shows the entire apparatus including particularly the rotatable bar retainers 132, which are used to hold the bars together so that flexibility of the bars does not permit an air leakage into the rectangular groove 108.

Gaging and sorting operations

Figure 2:
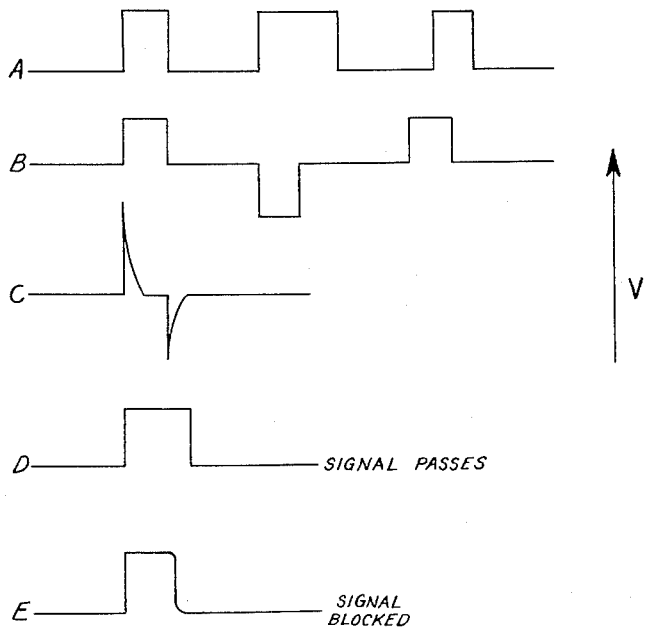
FIGURE 2 illustrates certain waveforms in the electrical circuits.

While the mechanical operations are occurring, the strand is being gaged. In the scanning area 121, the light from the light source is focused on the strand, as earlier described. It is preferred that the mirrors be so arranged as to cause one scan to overlap the preceding scan. As shown in FIGURE 2, if there is a gap between scans, the light which falls on the photomultiplier is cut off between the scan lines, and as shown in FIGURE 2, line A, the output consists of, first, the interruption of the line caused by the strand; next, a blank caused by the interruption between the scans; and, finally, a succeeding interruption caused by the strand in the next scan. The control circuits are unable to distinguish between the light beam interruption caused by the strands and the interruption caused by the interval between scans and, as a result, either a gating system is required or some other system to distinguish between the interruptions. A gate controlled by the flyback pulse of a cathode ray tube scanning could be used, with the image of a spot being used as the flying spot. To avoid such a difficulty, the mirrors are arranged so that the scans overlap and the second scan starts before the first one is completed. As a result, the output from the photomultiplier shows a light intensity, as shown in FIGURE 2, line B, in which the upward pulses or positive-going pulses are the output from the photomultiplier, correspond to the light interruption caused by the strand interruption of the beam during successive scans, and the negative-going pulse results from the double intensity of overlapped succeeding scans. The negative-going pulse is clipped in the amplifiers and hence only the positive-going pulse is used. The first adjustable resistor 20 provides a clipping level adjuster for the clipping level adjust tube 19, as shown in the second sheet of FIGURE 4, and is used to cut off the double intensity pulses.

As shown in FIGURE 2, line C, after differentiation, there are two peaks corresponding to the two edges of the strand. As shown in FIGURE 3, the leading edge signal serves to open the pulse gate and the signal gate at the same time. Meanwhile, a precision oscillator is feeding pulses to the pulse gate at a known rate. When the leading edge differentiated signal arrives, all of the gates are open, and the pulses from the precision oscillator then pass to the counting circuits. Each of the pulse counters 1, 2, 3 and 4, is set for the number of pulses which correspond to a selected size. When the sum of the preset figure and the incoming pulses reaches 1,000, the close trigger signal W from each pulse counter closes both its own pulse gate and the signal gate. Thus, the pulse gate, signal gate, and pulse counter are ready for the next succeeding scan. Meanwhile, the effect on the signal gate is as shown in FIGURE 2, line D, in which the signal gate goes from closed to opened to closed, and is opened for a predetermined length of time corresponding to the preset strand size. Where the reference pulse, or the signal gate open time, is longer than the length of the strand pulse, the trailing edge signal passes the signal gate, as shown at line D. Where the signal gate is open for a time not greater than the time between the leading edge and the trailing edge, as shown in line E of FIGURE 2, the signal is blocked. The trailing edge signal from the signal gate Y passes to the respective latch thyratron tubes, 56, 56A, 56B and 56C.

Meanwhile, when either pair of feed rolls contact each other, as they do when no strand (suture) is therebetween, the faster feed roll relay 63 for the faster feed rolls and/or the double-pole double-throw relay 65 for the entrance feed rolls operates the cathode return relay 68 so that the cathode returns from the thyratrons will open and the thyratrons cannot fire or, if fired, are reset. As soon as the strand has passed between both sets of feed rolls, the cathode return relay is inactivated and the cathode return relay points close. The mechanical functioning time of this relay in closing is sufficient to disregard the first few scans so that the strand is stretched and stabilized in the scanning area before the effective scans impinge upon the strand.

Each scan feeds a signal to the proper gate depending upon the strand size at that portion of the strand. As the minimum is desired, each scan fires the thyratron corresponding to its own size if that thyratron has not been previously fired. Thus, if a scan corresponds to a dimension the same or greater than any prior scan, there is no change in the thyratrons. If a scan is shorter than a prior scan, sufficiently to activate a new size classification, the thyratron corresponding to that size classification is fired and the thyratron remains conducting during the remainder of the passage of the strand. When the end of the strand passes the entrance feed rolls 55, the rolls come in contact, thus actuating the coil of the double-pole double-throw relay 65. The second pole 67 of this relay actuates the cathode return relay and resets the thyratrons. Meanwhile, each thyratron which has fired actuates the coil of its corresponding latching relay, 57, 57A, 57B or 57C and closes its corresponding latch relay contacts 58, 58A, 58B or 58C.

Assuming for purposes of illustration that a strand has been fed which actuates the first two gates only, latching relays 57 and 57A are operative and have closed the latch relay contacts, 58 and 58A. As a latching relay, these contacts remain closed until they are released. Meanwhile, the first pole 66 of the double-pole double-throw relay 65 has charged the latching coil condenser 70 and on release connects this condenser to release relay 71 which closes rapidly and feeds current through the latch relay contacts, 58, 58A, to the sorting relay contacts, 59, 59A. The contacts in 58A are inactive because the second latch relay contacts 58A operate which, in effect, shorts out the operating coil of the size No. 1 sorting relay and actuates the coil of the size No. 2 sorting relay 59A, which closes the contacts of the sorting relay contacts 60A, which actuates air valve 115A corresponding to the size No. 2 bin and air cylinder 105A moves the size No. 2 bin into position to receive the strand. Meanwhile, dumping air valve 114 has been actuated and the dumping of the strand is occurring. The relative speed of action is such that the bin arrives in position before the strand has time to fall. Meanwhile, the latching coil condenser 70 has become discharged so that the latching coils of the latching relays become inactive, the release relay 71 releases and the sorting bins travel back to their original position, the dumping air valve closes and the spring-loaded dumping cylinder 111A resets the grooved rotatable bar and the rubber-faced rotatable bar.

The above description is illustrative only, and it will be understood that different sizes of strands operate in a similar fashion to arrive at the proper bin. Any number of bins can be used. Four, and an oversize, are used for illustration.

Whereas the dumping mechanism disclosed, and the relays therefor, is one that is satisfactory, it will be understood that other relay systems can be used to sequence the operations of the dumping feature in a desired fashion. As for example, electrical rather than mechanical relays can be used to actuate each function in proper order.

Similarly, although a mechanical scan system is illustrated, it is to be understood that a flying spot from a cathode ray tube, or other form of flying spot, may be used as the source of the flying spot in the scanning area. Similarly, the amplifying set-up, as shown, is illustrative only. Other photosensitive devices and other amplifier circuits using tubes or transistors may be substituted, as understood by those skilled in the art, for the particular functions described. Whereas, certain tubes are shown by number, and certain of the resistors and condensers are shown by size, these values are to be taken as illustrative and may be varied in accordance with procedures well known in the art to achieve the desired results. For example, fewer stages of amplification may be used if more gain is obtained in each. Other counting circuits, etc., may be used to count the pulses. The frequency specified is illustrative and may be changed to give greater precision where required, or more rapid operation where desired. The ordinary techniques of construction for square waves with frequencies into the low megacycle range are used. With flying spot scanners of the cathode ray tube type, higher frequency operations can be used. Such modifications are familiar to those skilled in the art.

The invention of the present application is as defined in the following claims.

I claim:

1. A device for measuring the diameter of a strand which comprises: means to scan a light beam across a strand at a known rate, and thereby intercept said light beam over a period of time which is a function of the strand diameter, light sensitive means to convert the period of light beam interception into an electrical signal, a generator of high frequency electric pulses, means controlled by said electrical signal to transmit the said high frequency electrical pulses during said period of light beam interception, means to count said pulses, during said period of transmission, and means to readout the count of said pulses as a measure of strand diameter.

2. A device for measuring the diameter of a strand which comprises: means to scan a light beam across a strand at a known rate, and thereby intercept said light beam over a period of time which is a function of the strand diameter, light sensitive means to convert the period of light beam interception into an electrical signal, means to convert said electrical signal into a leading edge signal, corresponding to the light beam first being intercepted by the strand, and a trailing edge signal, corresponding to the light beam last being intercepted by the strand, a generator of high frequency electric pulses, means controlled by said leading edge signal to initiate transmission of the said high frequency electrical pulses, means to count said pulses after initiation of transmission, means to end the count after a predetermined number of pulses, and means to indicate if the trailing edge signal is prior to the end of the count, thereby indicating a strand whose diameter is less than that corresponding to a preset value.

3. A device for determining the minimum diameter of a strand at a plurality of longitudinal positions which comprises: means to scan a light beam across a strand at a known rate, and thereby intercept said light beam over a period of time which is a function of the strand diameter, light sensitive means to convert the period of light beam interception into an electrical signal, means to convert said electrical signal into a leading edge signal, corresponding to the light beam first being intercepted by the strand, and a trailing edge signal, corresponding to the light beam last being intercepted by the strand, a generator of high frequency electric pulses, means controlled by said leading edge signal to initiate transmission of the said high frequency pulses, means to count said pulses after initiation of transmission, means to end the count after a predetermined number of pulses, and means to indicate if the trailing edge signal is prior to the end of the count, thereby indicating a strand whose diameter is less than corresponding to a preset value at a particular scan position, and store the information as to the minimum value from each of a plurality of scans.

4. A device for determining the minimum diameter of a strand at a plurality of longitudinal positions along the strand which comprises: means to move the strand along its axis, means to scan a light beam across a strand at a known rate, and thereby intercept said light beam over a period of time which is a function of the strand diameter at a particular scan position, light sensitive means to convert the period of light beam interception into an electrical signal, means to convert said electrical signal into a leading edge signal, corresponding to the light beam first being intercepted by the strand, and a trailing edge signal, corresponding to the light beam last being intercepted by the strand, a generator of high frequency electric pulses, means controlled by said leading edge signal to initiate transmission of the said high frequency pulses during a plurality of means to count said pulses during the period of transmission, means to end the count after a different predetermined number of pulses for each counting means, and means to indicate if the trailing edge signal is prior to the end of the count for each of said counting means, thereby indicating a strand whose diameter is less than corresponding to each of a plurality of preset values at a particular scan position, and store the information as to the minimum value from each of a plurality of scans.

5. A device for classifying strands into groups in which the minimum diameter of any strand at any position along the axis is larger than a preset value based on single diameter measurements at a plurality of longitudinal positions which comprises: means to scan a light beam across a strand at a known rate, and thereby intercept said light beam over a period of time which is a function of the strand diameter, light sensitive means to convert the period of light beam interception into an electrical signal, means to convert said electrical signal into a leading edge signal, corresponding to the light beam first being intercepted by the strand, and a trailing edge signal, corresponding to the light beam last being intercepted by the strand, a generator of high frequency electric pulses, a pulse gate opened by said leading edge signal to transmit the said high frequency pulses, means to count said pulses, means to close said pulse gate and end the count after a predetermined number of pulses, a signal gate opened and closed concurrently with said pulse gate, means to pass the trailing edge signal to said signal gate, and through the signal gate only if the trailing edge signal is prior to the end of the count, thereby indicating a strand whose diameter at that position is less than corresponding to a preset value, and store the information as to the minimum value for the single diameter measurement, and means for separating the strands into a group which has no diameter smaller than the preset value, and those smaller.

6. The device of claim 5 in which a plurality of pulse gates are present and a plurality of signal gates and the means for separating the strands includes means for separating into a plurality of groups, each of which consists of strands having no diameter smaller than a specific value, but whose minimum value is too small to classify the strand in with the next larger minimum size.

7. A device for determining whether the diameter of a strand is above or below a fixed value which comprises: means for imposing on a photoelectric device light and dark images, the time of said dark images being proportional to the diameter of said strand, and converting said dark images into an electrical signal, means for converting the beginning and end of the electric signal for each of said dark periods into a leading edge signal and a trailing edge signal, respectively, means for generating pulses at a precise rate and means for comparison of the time between said leading edge signal and trailing edge signal with the time required for a preset number of said pulses.

8. A device for determining the minimum diameter of a strand which comprises, in combination: means for repeatedly passing a small light beam at a known rate of speed across said strand, each successive passage being started before the previous passage is finished, light sensitive means for converting the shadows of said strand into an electric signal, means for shaping said signal into square waves having leading and trailing edges, means for generating a series of precise electrical pulses, a selected number of said pulses corresponding to a predetermined total time, means for comparing the time between the said leading edge and the trailing edge of said square waves with the length of time for said pulses, thus indicating a diameter less than the preset value, and means to store information as to whether the strand has any diameter corresponding to less than the preset value.

9. The method of classifying strands into groups in which the minimum diameter of any strand, based on single diameter measurements at a plurality of positions along the axis of the strand, is larger than a preset value which comprises: scanning a light beam across a strand at a known rate, intercepting said light beam as it passes the strand over a period of time which is a function of strand diameter, converting the period of light beam interception to an electrical signal, opening a pulse gate and a signal gate at a time corresponding to the interception of said light beam by said strand, passing a high frequency series of electrical pulses through the pulse gate, counting the number of pulses to correspond with the time of passage for a preset diameter, closing both said pulse gate and said signal gate at the end of the pulse count, passing a signal corresponding to the time at which the light beam completes its passage across the strand diameter to the signal gate, and through the signal gate only if said signal reaches the signal gate prior to the end of the above pulse count, storing the information as to whether such a signal has passed the signal gate for any diameter scan and separating the strands into a group in which the closing signal has passed the signal gate corresponding to strands having at least one diameter less than the preset minimum, and the remaining strands into a group having no diameters less than said preset minimum.

10. The method of claim 9 in which the strands are classified into a plurality of groups, each strand in each of said groups having a minimum diameter greater than the preset minimum value for said group.

No references cited.

UNITED STATES PATENT OFFICE
CERTIFICATION OF CORRECTION

Patent No. 2,999,590                September 12, 1961

Gerard E. Gerhardt

It is hereby certified that error appears in the above numbered patent requiring correction and that the said Letters Patent should read as corrected below.

Column 1, line 43, for "suiture" read -- suture --; line 54, after "than" insert -- the --; column 3, line 12, for "cans" read -- scans --; column 4, line 12, for "6EN6" read -- 6BN6 --; line 22, for "scaning" read -- scanning --; column 5, line 43, after "23" insert -- fed --; line 68, strike out "latch operating signal, is fed to the control grid of a"; column 7, line 24, for "vacum" read -- vacuum --; line 53, for "stand" read -- strand --; column 8, line 67, for "strands" read -- strand --.

Signed and sealed this 3rd day of April 1962.

(SEAL)
Attest:

ERNEST W. SWIDER
Attesting Officer

DAVID L. LADD
Commissioner of Patents